(12) United States Patent
Koutyrine et al.

(10) Patent No.: US 9,170,810 B2
(45) Date of Patent: Oct. 27, 2015

(54) SELECTION AND ASSESSMENT OF SOFTWARE COMPONENTS

(75) Inventors: Oleg Koutyrine, Dielheim (DE); Andrey Hoursanov, Mannheim (DE)

(73) Assignee: SAP SE, Walldorf (DE)

( * ) Notice: Subject to any disclaimer, the term of this patent is extended or adjusted under 35 U.S.C. 154(b) by 600 days.

(21) Appl. No.: 13/271,005

(22) Filed: Oct. 11, 2011

(65) Prior Publication Data

US 2013/0091488 A1 Apr. 11, 2013

(51) Int. Cl.
 *G06F 9/44* (2006.01)
 *G06F 11/36* (2006.01)
(52) U.S. Cl.
 CPC .............. *G06F 8/77* (2013.01); *G06F 11/3608* (2013.01)
(58) Field of Classification Search
 None
 See application file for complete search history.

(56) References Cited

U.S. PATENT DOCUMENTS

| 7,448,028 | B2 | 11/2008 | Koutyrine et al. | |
|---|---|---|---|---|
| 7,614,040 | B2 * | 11/2009 | Wagner et al. | 717/120 |
| 7,761,865 | B2 | 7/2010 | Stienhans et al. | |
| 8,601,439 | B2 * | 12/2013 | Aslam et al. | 717/121 |
| 2004/0172637 | A1 | 9/2004 | Koutyrine | |
| 2010/0063785 | A1 * | 3/2010 | Pich et al. | 703/6 |
| 2012/0137240 | A1 * | 5/2012 | Krueger | 715/771 |

OTHER PUBLICATIONS

Yacoub et al, "Scenario-Based Reliability Analysis of Component-Based Software", 1999.*

* cited by examiner

*Primary Examiner* — Jason Mitchell
*Assistant Examiner* — Christine Dang
(74) *Attorney, Agent, or Firm* — Fish & Richardson P.C.

(57) ABSTRACT

The present disclosure involves systems, software, and computer implemented methods for providing selection and assessment of software components. One process includes operations for identifying a software component for assessment. Dependencies associated with the software component are analyzed, wherein analyzing dependencies includes identifying at least one relevant perspective associated with the software component, identifying a scope associated with the at least one relevant perspective, and determining whether the software component is associated with at least one related infrastructure component based on the scope or at least one other software component that the software component depends on based on the scope. The software component and each of the at least one related infrastructure component or the at least one other software component are assessed against a set of criteria.

20 Claims, 8 Drawing Sheets

SELECTION AND ASSESSMENT OF SOFTWARE COMPONENTS

TECHNICAL FIELD

The present disclosure relates to software, computer systems, and computer implemented methods for providing comprehensive selection and assessment of software components.

BACKGROUND

Software products may be composed of smaller components, partitioned according to their functionalities. In some instances, software components may be marketed, priced, sold, and delivered separately. For example, the software component may define an application programming interface (API) that provides access to a particular function of the software product. Different software components may be developed and distributed by different parties. For example, one company may manage overall development of a particular software product but include software components developed by third parties in the software product to perform specific functions. Incorporating third party software into the lifecycle of a software product, however, may lead to risks or complications with respect to licensing, support, delivery, production, and other factors. In some instances, third party software may be associated with a complicated network of libraries interlinked through various dependencies.

SUMMARY

The present disclosure describes techniques for providing selection and assessment of software components. A computer program product is encoded on a tangible storage medium, where the product comprises computer readable instructions for causing one or more processors to perform operations. These operations can include identifying a software component for assessment. Dependencies associated with the software component are analyzed, wherein analyzing dependencies includes identifying at least one relevant perspective associated with the software component, identifying a scope associated with the at least one relevant perspective, and determining whether the software component is associated with at least one related infrastructure component based on the scope or at least one other software component that the software component depends on based on the scope. The software component and each of the at least one related infrastructure component or the at least one other software component are assessed against a set of criteria.

These and other embodiments can optionally include one or more of the following features. The set of criteria includes at least one of licensing, supportability, delivery, platform availability, or architecture assessment. The at least one relevant perspective includes at least one of a platform perspective, a design time perspective, or a runtime perspective. Identifying the scope includes defining relevant criteria to include in the set of criteria for assessing the software component. Determining whether the software component is associated with at least one other software component that the software component depends on includes identifying software components related to the software component based on transitive properties. The operations further include iteratively analyzing dependencies for each of the at least one related infrastructure component or the at least one other software component to identify additional software components or infrastructure components for assessment; and assessing the additional software components or infrastructure components against the set of criteria. The operations further include extending the scope to include potential components upon which the at least one related infrastructure component or the at least one other software component depend.

While generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
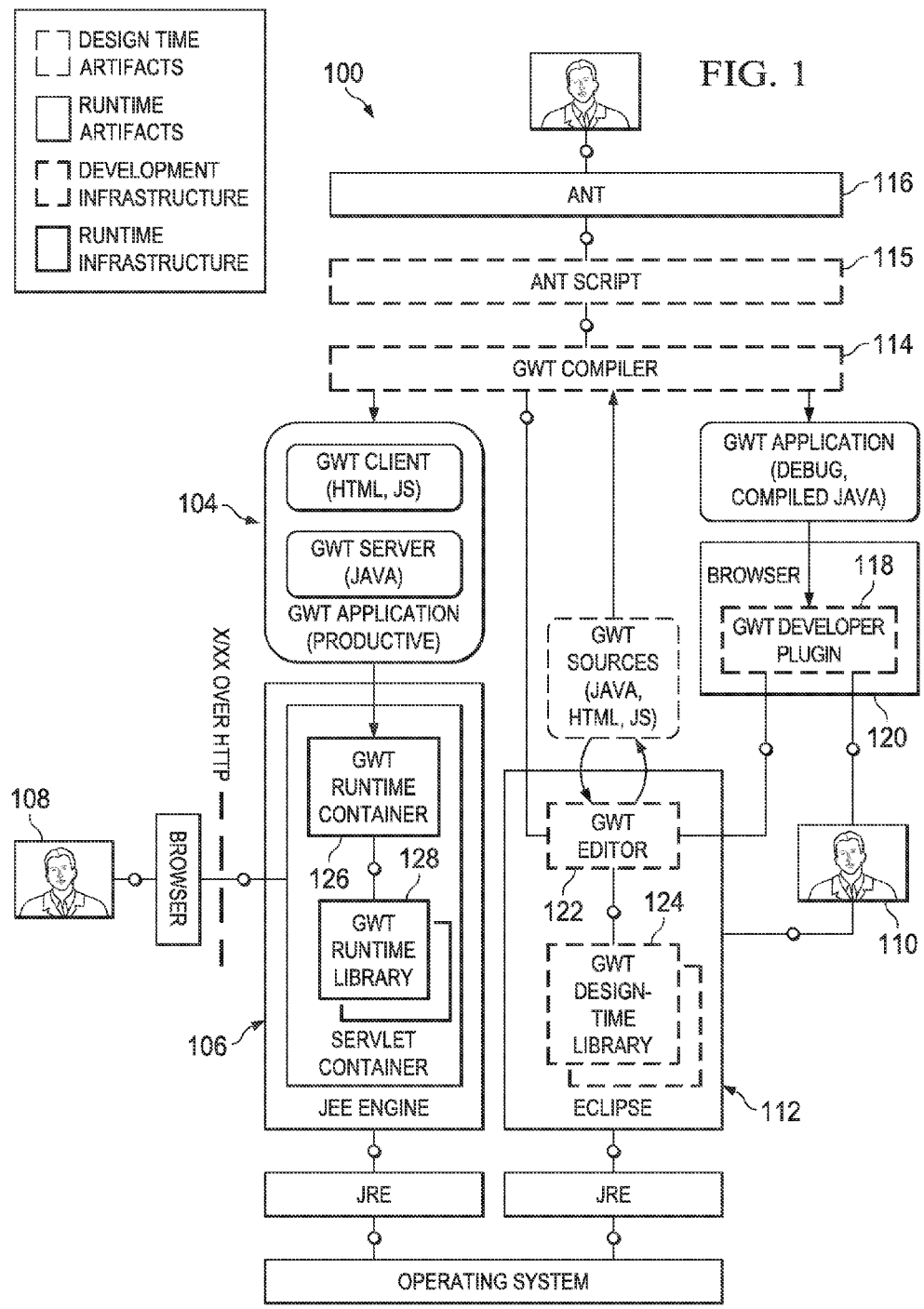
FIG. 1 illustrates an example system implementing a commercial software product in which the use of third party components may require specific assessment of potential risks.

This disclosure generally describes computer systems, software, and computer implemented methods for providing comprehensive selection and assessment of software components. Certain software components (e.g., third party components) may need to be assessed for compatibility, security, and other issues before they are selected for inclusion in a software product. Software components are identified for assessment, and other components that are related to the software components through various dependencies are identified for assessment as well. The dependencies may be identified based on use cases, perspectives, boundary conditions, and other factors associated with a particular software component. The process may be performed iteratively, in some instances, to identify additional related components at multiple layers of dependencies for assessment. The software components and each of, or at least a portion, of the related components are then assessed against a set of criteria. For example, the software components may be assessed based on various licensing, support, delivery, production, platform, or architecture requirements associated with the software product.

In some instances, software products can include one or more software components that may be developed by third parties. For example, the developer of a particular software product may select an existing third party component that performs a particular function to reduce the cost of development and to accelerate the time to market. The use of third party components, however, may result in additional risk or challenges due to various factors. For example, a company may sell a product under its own license, but if the product also contains third party components, the company may need to determine how the third party components are licensed. The company may also need to determine how to provide timely and reliable support to customers, even if the product contains third party components that have different support models, or may not be supported at the time or at all.

In some instances, the company may need to create a consistent policy and process for delivery of product changes, service packages, or patches, which may be complicated if some third party components have independent lifecycles. The company may also face difficulties in producing the product if certain components have different production lifecycles or are owned by other organizations. The company may need to evaluate platform availability and the resulting platform availability matrix if the product includes third party components capable of running only on certain platforms. Other considerations may be relevant, such as whether the use of certain components violate patents.

Assessment of the potential risks may be particularly important in certain use cases. For example, in the acquisition of a software vendor by another software vendor, the acquiring vendor may trigger a special assessment to determine the implications of use of software components of the acquired vendor, including assessment of any third party software used in the acquired vendor's products. In other cases, a vendor consuming open source and freeware software components for use in its commercial products may need to evaluate the effectiveness and risk of using community-controlled components given the various factors described above.

Analyzing each aspect, implication, or risk exposed when certain third party software components are used as part of another commercial software product may be difficult, time consuming, and tedious without a definite scope for identifying each of the components and dependencies needed in the analysis. Overlooking one aspect in the analysis may have negative consequences for the software product. FIG. 1 illustrates an example system 100 implementing a commercial software product in which the use of third party components may require specific assessment of potential risks. In particular, a business application may run on a JEE engine 106 for performing business processes for a client 108. The vendor of the product including business application may be able to provide the business logic for the application but may have difficulties selecting a user interface (UI) technology for providing a rich user experience, easing integration with server-side implementation, or enabling fast UI development.

As seen in FIG. 1, there may be a developer 110 that will use a third party web toolkit application 104 to build user interfaces in a software development environment (e.g., Eclipse-based environment) 112. The web toolkit application 104 may be designed for creating and maintaining complex user interfaces, and may provide a technology stack including both runtime and development artifacts, such as a web toolkit compiler 114, which may be associated with an automated software build tool 116 and the automated software build tool script 115 specific to the web toolkit application 104, for example. The artifacts may also include a native-code web toolkit developer plugin 118 for debugging in a browser 120 of the developer 110, a web toolkit application editor 122, web toolkit design time libraries 124 for creation of widgets, a web toolkit runtime container 126, and runtime libraries 128. In the illustrated example, the components associated with the web toolkit application 104, such as the web toolkit compiler 114, web toolkit developer plugin 118, web toolkit application editor 122, web toolkit design time libraries 124, web toolkit runtime container 126, and web toolkit runtime libraries 128, used by developer 110 for the business application implemented in the system 100 of FIG. 1 may be regarded as third party components. The vendor of the business application may want to assess a number of factors regarding the implications of using the third party components.

For example, the vendor may need to determine whether the third party technology meets functional and non-functional expectations, and whether or how the expectations may be altered or adjusted if necessary. In some instances, a default set of widgets may not be sufficient to meet functional requirements, and so third party libraries 128 associated with another developer/vendor may need to be used to design another set of widgets using the web toolkit application 104. Accordingly, the newly added libraries may also need to be included in the assessment for using the third party components supplied by the third party vendor. In other cases, a selected widget may work only with a particular browser while a product requires support for all major browsers. Thus, various third party components may need to be assessed for functionality.

In certain instances, every artifact associated with a third party component may need to be assessed to determine whether the third party component meets supportability requirements. The artifacts may include the particular third party software component and its dependencies, infrastructure elements and their dependencies, additional libraries and their dependencies, and so on. In the illustrated example, the web toolkit application 104 may be fully supported by the third party, but the software development environment 112 may be provided by a different vendor with a different support policy. An Eclipse-based software development environment 112, for example, may only be supported for the latest version but not for historical versions. A conflict may arise if a bug fix for the web toolkit application 104 is tightly coupled to an older release of the software development environment 112.

Other factors, such as licensing requirements, may need to be included in the assessment of various components and artifacts. Accordingly, a model and method for comprehensive selection of third party components for assessment against a set of criteria may facilitate assessment of the necessary components to avoid potential problems with respect to incorporating third party components into a particular software product.

Figure 2:
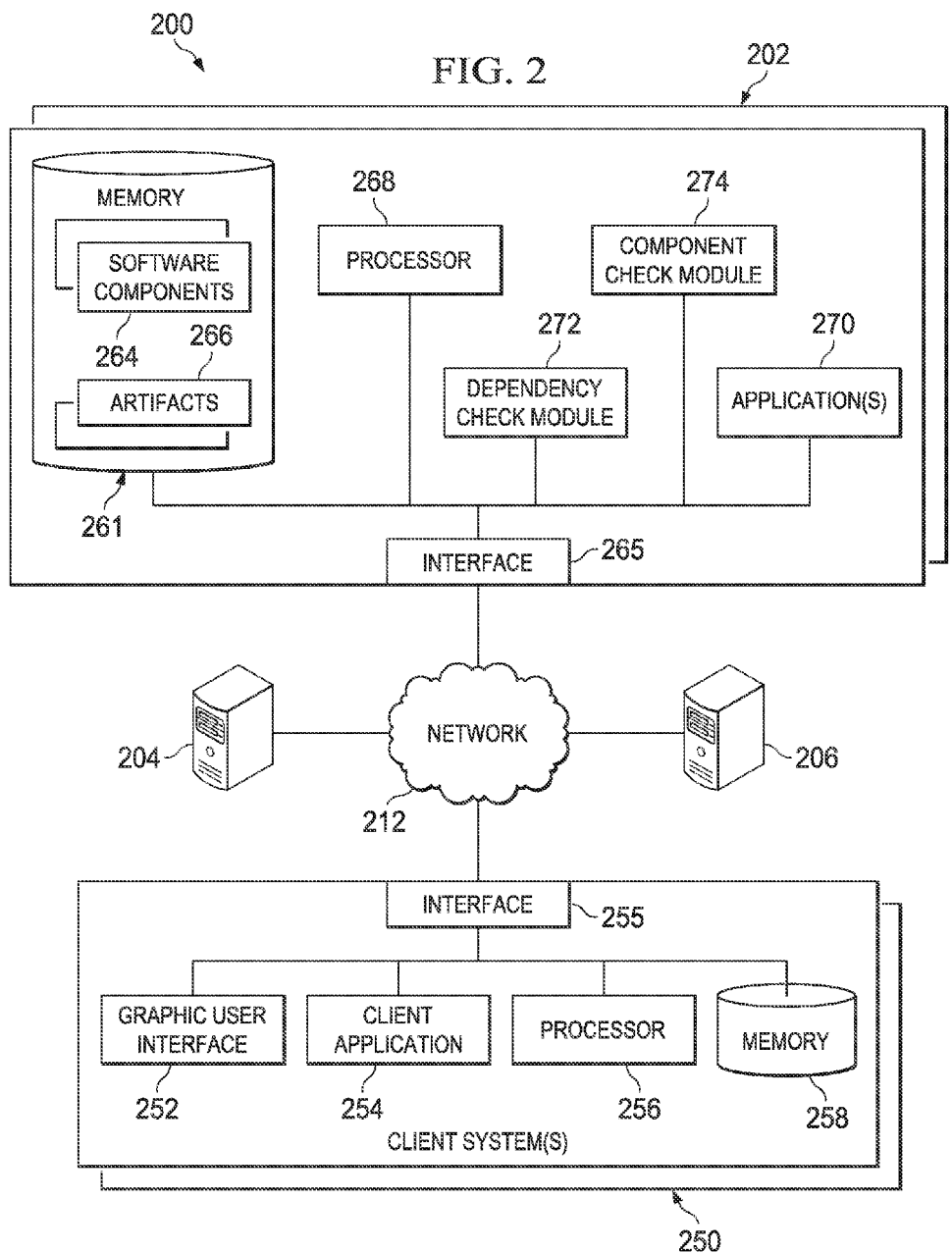
FIG. 2 illustrates an example environment for providing comprehensive selection and assessment of software components.

Turning to the illustrated example, FIG. 2 illustrates an example environment 200 for providing comprehensive selection and assessment of software components. The illustrated environment 200 includes or is communicably coupled with one or more clients 250 and servers 202, 204, and 206, at least some of which may communicate across network 212. In general, environment 200 depicts an example configuration of a system capable of identifying a particular software component and additional components for assessment by analyzing the dependencies of the particular software component. In some implementations, the dependency check module 272 and component check module 274 for identifying relevant components for assessment can be implemented as hosted applications on a server, such as server 202, accessible to a user at client 250 through a network 212. Further, the dependency check module 272 and component check module 274 and other services provided by server 202 can be distributed across multiple servers, such as servers 204 and 206, in a distributed cluster-based environment, for example. In a distributed cluster-based environment, one or more additional servers (e.g., servers 204 and 206) can be included in environment 200, each server having components similar to those depicted in FIG. 2 for server 202 and providing services associated with distributed applications hosted by the servers in the distributed cluster-based environment. In certain instances, client 250 and servers 202, 204, and 206 can be logically grouped within a cloud computing network. Accordingly, the system may be provided as an on-demand solution through the cloud computing network as well as a traditional server-client system or a local application at client 250. Alternatively, the dependency check module 272 and component check module 274 may be provided through a traditional server-client implementation or locally at client 250 without the need for accessing a hosted application through network 212.

In general, server 202 is any server that stores one or more applications 270, where at least a portion of the applications 270 may be hosted applications executed via requests and responses sent to users or clients within and communicably coupled to the illustrated environment 200 of FIG. 2. For example, server 202 may be a Java Platform, Enterprise Edition (JEE)-compliant application server that includes Java technologies such as Enterprise JavaBeans (EJB), JEE Connector Architecture (JCA), Java Messaging Service (JMS), Java Naming and Directory Interface (JNDI), and Java Database Connectivity (JDBC). In some instances, the server 202 may store a plurality of various applications 270, while in other instances, the server 202 may be a dedicated server meant to store and execute only a single application 270. In some instances, the server 202 may comprise a web server or be communicably coupled with a web server, where the applications 270 represent one or more web-based applications accessed and executed via network 212 by clients 250 of the system to perform the programmed tasks or operations of the application 270.

At a high level, the server 202 comprises an electronic computing device operable to receive, transmit, process, store, or manage data and information associated with the environment 200. The server 202 illustrated in FIG. 2 can be responsible for receiving application requests from one or more client applications or business applications associated with clients 250 of environment 200, responding to the received requests by processing said requests in the associated application 270, and sending the appropriate response from the application 270 back to the requesting client application. The server 202 may also receive requests and respond to requests from other components on network 212. Alternatively, the application 270 at server 202 can be capable of processing and responding to requests from a user locally accessing server 202. Accordingly, in addition to requests from the external clients 250 illustrated in FIG. 2, requests associated with the applications 270 may also be sent from internal users, external or third-party customers, other automated applications, as well as any other appropriate entities, individuals, systems, or computers.

As used in the present disclosure, the term "computer" is intended to encompass any suitable processing device. For example, although FIG. 2 illustrates a single server 202, environment 200 can be implemented using one or more servers such as servers 204 and 206, as well as computers other than servers, including a server pool. Indeed, server 202 and client 250 may be any computer or processing device such as, for example, a blade server, general-purpose personal computer (PC), Macintosh, workstation, UNIX-based workstation, personal digital assistant (PDA), mobile phone, palmtop computer, tablet, or any other suitable device. In other words, the present disclosure contemplates computers other than general purpose computers, as well as computers without conventional operating systems. Further, illustrated server 202 and client 250 may be adapted to execute any operating system, including Linux, UNIX, Windows, Mac OS, or any other suitable operating system.

In the present implementation, and as shown in FIG. 2, the server 202 includes a processor 268, an interface 265, a memory 261, and one or more applications 270. The interface 265 is used by the server 202 for communicating with other systems in a client-server or other distributed environment (including within environment 200) connected to the network 212 (e.g., clients 250, as well as other systems communicably coupled to the network 212). Generally, the interface 265 comprises logic encoded in software and/or hardware in a suitable combination and operable to communicate with the network 212. More specifically, the interface 265 may comprise software supporting one or more communication protocols associated with communications such that the network 212 or interface's hardware is operable to communicate physical signals within and outside of the illustrated environment 200.

In some implementations, server 202 may include a user interface, such as a graphical user interface (GUI). The GUI comprises a graphical user interface operable to, for example, allow the user of the server 202 to interface with at least a portion of the platform for any suitable purpose, such as creating, preparing, requesting, or analyzing data, as well as viewing and accessing source documents associated with business transactions. Generally, the GUI provides the particular user with an efficient and user-friendly presentation of business data provided by or communicated within the system. The GUI may comprise a plurality of customizable frames or views having interactive fields, pull-down lists, and buttons operated by the user. For example, GUI may provide interactive elements that allow a user to select from a list of suggested entries for input into a data field displayed in GUI. More generally, GUI may also provide general interactive elements that allow a user to access and utilize various services and functions of application 270. The GUI is often configurable, supports a combination of tables and graphs (bar, line, pie, status dials, etc.), and is able to build real-time portals, where tabs are delineated by key characteristics (e.g. site or micro-site). Therefore, the GUI contemplates any suitable graphical user interface, such as a combination of a generic web browser and command line interface (CLI) that processes information in the platform and efficiently presents the results to the user visually.

Generally, example server 202 may be communicably coupled with a network 212 that facilitates wireless or wireline communications between the components of the environment 100 (i.e., between the server 202 and clients 250), as well as with any other local or remote computer, such as additional clients, servers, or other devices communicably coupled to network 212 but not illustrated in FIG. 2. In the illustrated environment, the network 212 is depicted as a single network in FIG. 2, but may be a continuous or discontinuous network without departing from the scope of this disclosure, so long as at least a portion of the network 212 may facilitate communications between senders and recipients.

Network 212 may be all or a portion of an enterprise or secured network, while in another instance at least a portion of the network 212 may represent a connection to the Internet. In some instances, a portion of the network 212 may be a virtual private network (VPN), such as, for example, the connection between client 250 and server 202. Further, all or a portion of network 212 can comprise either a wireline or wireless link. Example wireless links may include 802.11a/b/g/n, 802.20, WiMax, and/or any other appropriate wireless link. In other words, network 212 encompasses any internal or external network, networks, sub-network, or combination thereof operable to facilitate communications between various computing components inside and outside the illustrated environment 200. The network 212 may communicate, for example, Internet Protocol (IP) packets, Frame Relay frames, Asynchronous Transfer Mode (ATM) cells, voice, video, data, and other suitable information between network addresses. Network 212 may also include one or more local area networks (LANs), radio access networks (RANs), metropolitan area networks (MANs), wide area networks (WANs), all or a portion of the Internet, and/or any other communication system or systems at one or more locations. Network 212, however, is not a required component of the present disclosure, and the elements hosted by server 202, such as the dependency check module 272 and component check module 274, may be implemented locally at a client 250 or locally at server 202.

Client(s) 250 may have access to resources such as server 202 within network 212. In certain implementations, the servers within the network 212, including server 202 in some instances, may comprise a cloud computing platform for providing cloud-based services. The terms "cloud," "cloud computing," and "cloud-based" may be used interchangeably as appropriate without departing from the scope of this disclosure. Cloud-based services can be hosted services that are provided by servers such as 202, 204, and 206 and delivered across a network to a client platform to enhance, supplement, or replace applications executed locally on a client computer. Clients 250 can use cloud-based services to quickly receive software upgrades, applications, and other resources that would otherwise require a lengthy period of time before the resources can be delivered to clients 250. Additionally, other devices may also have access to cloud-based services, such as on-demand services provided by servers accessible through network 212. A cloud platform deployment implementation, however, is not a required element of the present disclosure, and other distributed infrastructures such as cluster-based systems can also be used.

As illustrated in FIG. 2, server 202 includes a processor 268. Although illustrated as a single processor 268 in FIG. 2, two or more processors may be used according to particular needs, desires, or particular embodiments of environment 200. Each processor 268 may be a central processing unit (CPU), a blade, an application specific integrated circuit (ASIC), a field-programmable gate array (FPGA), or another suitable component. Generally, processor 268 executes instructions and manipulates data to perform the operations of server 202 and, specifically, the one or more plurality of applications 270. Specifically, the server's processor 268 executes the functionality required to receive and respond to requests from client system 250 and respective client applications 254 or other servers 204 and 206 in environment 200, as well as the functionality required to perform the other operations of the application 270.

Regardless of the particular implementation, "software" may include computer-readable instructions, firmware, wired or programmed hardware, or any combination thereof on a tangible, non-transitory, medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Some software may be associated with BPM notations including BPMN, BPEL, UML state charts, event-driven process chains (EPC), Petri Nets, and the like. It will be understood that while portions of the software illustrated in FIG. 2 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 200, processor 268 executes one or more applications 270 on server 202.

At a high level, each of the one or more applications 270 is any application, program, module, process, or other software that may execute, change, delete, generate, or otherwise manage information according to the present disclosure, particularly in response to and in connection with one or more requests received from the illustrated client system 250 and its associated client applications 254 or from other servers or components through a network 212. In certain cases, only one application 270 may be located at a particular server 202. In others, a plurality of related and/or unrelated applications 270 may be stored at a single node 202, or located across a plurality of other nodes 202, as well. In certain cases, environment 200 may implement a composite business process application 270. For example, portions of the composite application may be implemented as Enterprise Java Beans (EJBs) or design-time components may have the ability to generate run-time implementations into different platforms, such as JEE (Java Platform, Enterprise Edition), ABAP (Advanced Business Application Programming) objects, or Microsoft's .NET, among others.

Additionally, one or more of the applications 270 may represent web-based applications accessed and executed by remote system 250 or client applications 254 via the network 212 (e.g., through the Internet). Further, while illustrated as internal to server 202, one or more processes associated with a particular application 270 may be stored, referenced, or executed remotely. For example, a portion of a particular application 270 may be a web service associated with the application that is remotely called, while another portion of the application 270 may be an interface object or agent bundled for processing at a client system 250. Moreover, any or all of the applications 270 may be a child or sub-module of another software module or enterprise application (not illustrated) without departing from the scope of this disclosure. Still further, portions of the application 270 may be executed by a user working directly at server 202, as well as remotely at client system 250.

As illustrated, server 202 can also include a dependency check module 272 and a component check module 274. In certain implementations, the dependency check module 272 can analyze a particular software component, which may include checking for dependencies associated with the software component, such as other software or infrastructure components upon which the particular software component depends, and identify relevant components for assessment based on the dependencies. In some implementations, given a particular software component and use case, the dependency check module 272 may select a relevant perspective and particular scope for analyzing potential components within the particular scope. The components within the particular scope may be identified for assessment to determine whether the particular component and any other relevant components (e.g., components identified based on dependencies) are suitable for use with another software product, for example. The component check module 274 may be configured to perform tasks related to assessment of various components against a set of criteria, such as whether a particular component complies with licensing, support, delivery, platform, or architecture requirements.

In some implementations, the dependency check module 272 and the component check module 274 can be executed by a different processor or server external to server 202, such as by a server communicably coupled to server 202 through network 212. For example, the dependency check module 272 and the component check module 274 may be provided as an on-demand service through a cloud computing network, as a web service accessible via network 212, as a service provided on a dedicated server, or as an application in a cluster-based distributed network. The dependency check module 272 and the component check module 274 may be separate from application 270, while in other instances, they may be embedded within or part of a particular one or more hosted applications. In some instances, application 270 may be communicably coupled to the dependency check module 272 or the component check module 274, allowing application 270 to access and take advantage of the functionality provided by the dependency check module 272 and the component check module 274.

In general, server 202 also includes memory 261 for storing data and program instructions. Memory 261 may include any memory or database module and may take the form of volatile or non-volatile memory including, without limitation, magnetic media, optical media, random access memory (RAM), read-only memory (ROM), removable media, or any other suitable local or remote memory component. Memory 261 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of server 202 and its one or more business process applications 270.

Memory 261 may also store data objects such as software components 264 and artifacts 266. In general, software components 264 may include stand-alone applications, modules, embedded applications, user interfaces, widgets, functions, or any other application that may be assessed against a set of criteria. In some implementations, software components 264 may include binary units that export and import functionality using a standardized interface mechanism. Software components 264 may represent one or more logical or organization-related processes or tasks. The underlying infrastructure of a software component 264 may support composition of components by providing mechanisms for introspection, event-handling, persistence, dynamic linking, and layout management. In certain instances, software components 264 may be independent of a particular system, language, platform, application, or tool. Accordingly, software components 264 may be integrated with other software components from different providers, for example, into a common system. Artifacts 266 may include any by-product produced during development of software, including use cases, class diagrams, models, requirements, source code files, documentation, executable files, and design documents. Artifacts 266 associated with software components may also be used to generate documentation for the software components.

The illustrated environment of FIG. 2 also includes one or more clients 250. Each client 250 may be any computing device operable to connect to or communicate with at least the server 202 and/or via the network 212 using a wireline or wireless connection. In some implementations, as illustrated in FIG. 2, client 250 can also include a processor 256, an interface 255, a graphical user interface (GUI) 252, a client application 254, and a memory 258. In general, client 250 comprises an electronic computer device operable to receive, transmit, process, and store any appropriate data associated with the environment 200 of FIG. 2. It will be understood that there may be any number of clients 250 associated with, or external to, environment 200. For example, while illustrated environment 200 includes one client 250, alternative implementations of environment 200 may include multiple clients communicably coupled to the server 202, or any other number of clients suitable to the purposes of the environment 200. Additionally, there may also be one or more additional clients 250 external to the illustrated portion of environment 200 that are capable of interacting with the environment 200 via the network 212. Further, the term "client" and "user" may be used interchangeably as appropriate without departing from the scope of this disclosure. Moreover, while each client 250 is described in terms of being used by a single user, this disclosure contemplates that many users may use one computer, or that one user may use multiple computers.

The GUI 252 associated with client 250 comprises a graphical user interface operable to, for example, allow the user of client 250 to interface with at least a portion of the platform for any suitable purpose, such as creating, preparing, requesting, or analyzing data, as well as viewing and accessing source documents associated with software components. Generally, the GUI 252 provides the particular user with an efficient and user-friendly presentation of data provided by or communicated within the system. The GUI 252 may comprise a plurality of customizable frames or views having interactive fields, pull-down lists, and buttons operated by the user. For example, GUI 252 may provide interactive elements that allow a user to enter, modify, select, or model elements of software components in GUI 252. A view of a software component and related components may be presented and accessible to the user through GUI 252, such as through a web browser, for example. More generally, GUI 252 may also provide general interactive elements that allow a user to access and utilize various services and functions of application 254. The GUI 252 is often configurable, supports a combination of tables and graphs (bar, line, pie, status dials, etc.), and is able to build real-time portals, where tabs are delineated by key characteristics (e.g. site or micro-site). Therefore, the GUI 252 contemplates any suitable graphical user interface, such as a combination of a generic web browser, intelligent engine, and command line interface (CLI) that processes information in the platform and efficiently presents the results to the user visually.

As used in this disclosure, client 250 is intended to encompass a personal computer, touch screen terminal, workstation, network computer, kiosk, wireless data port, smart phone, personal data assistant (PDA), one or more processors within these or other devices, or any other suitable processing device. For example, each client 250 may comprise a computer that includes an input device, such as a keypad, touch screen, mouse, or other device that can accept user information, and an output device that conveys information associated with the operation of the server 202 (and application 270) or the client 250 itself, including digital data, visual information, client application 254, or GUI 252. Both the input and output device may include fixed or removable storage media such as a magnetic storage media, CD-ROM, or other suitable media to both receive input from and provide output to users of client 250 through the display, namely, GUI 252.

While FIG. 2 is described as containing or being associated with a plurality of elements, not all elements illustrated within environment 200 of FIG. 2 may be utilized in each alternative implementation of the present disclosure. For example, although FIG. 2 depicts an environment implementing a hosted application at server 202 that can be accessed by client computer 250, in some implementations, server 202 executes a local application that features an application UI accessible to a user directly utilizing GUI 252. Further, although FIG. 2 depicts a server 202 external to network 212, servers may be included within the network 212 as part of a cloud network solution, for example. Additionally, one or more of the elements described herein may be located external to environment 200, while in other instances, certain elements may be included within or as a portion of one or more of the other described elements, as well as other elements not described in the illustrated implementation. Further, certain elements illustrated in FIG. 2 may be combined with other components, as well as used for alternative or additional purposes in addition to those purposes described herein.

Figure 3:
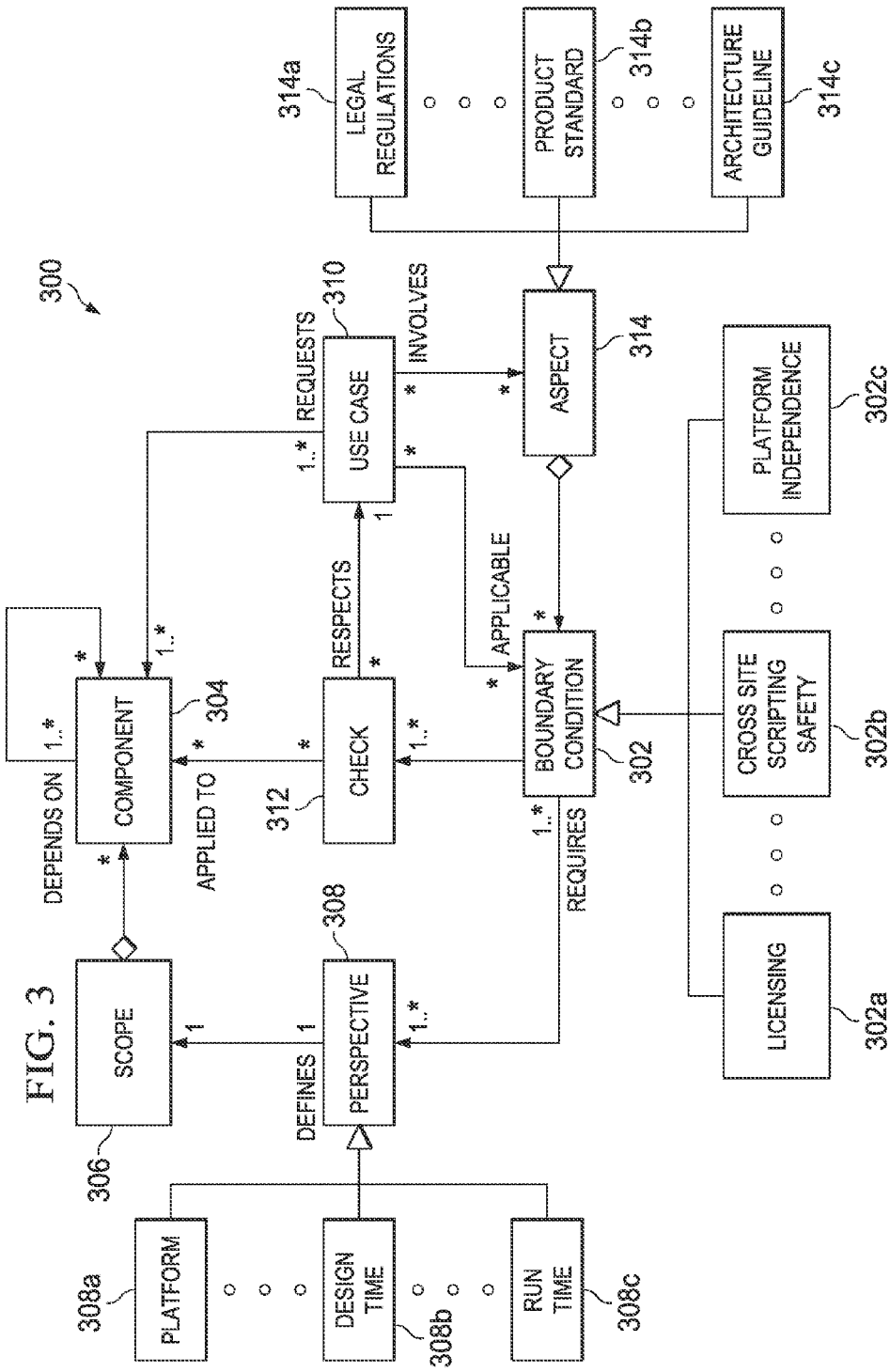
FIG. 3 is a diagram of an example model for providing comprehensive selection and assessment of software components using an appropriate system, such as the system described in FIG. 2.

FIG. 3 illustrates an example diagram of a model 300 for software assessment. In some instances, in order to fully assess whether a particular software component satisfies a set of requirements or criteria, other components associated with the particular software component may also need to be assessed. As depicted in FIG. 3, a model 300 may provide guidance for assessing the particular software component as well as extending the scope to include other related components for assessment. In the illustrated example, an original software component 304 may be identified for assessment. Each component 304 may be associated with a use case 310 bridging the business and technical usage scenarios. The use case 310 may include different scenarios in which the software component 304 is to be used, which may affect the types of checks and analysis to apply to the software component 304.

Certain boundary conditions 302 may also apply to the component 304 during assessment. For example, software created for certain industries may need to comply with boundary conditions related to specific security or auditing requirements. As seen in FIG. 3, examples of boundary conditions may include licensing requirements 302a, cross-site scripting safety requirements 302b, or platform independence requirements 302c. The use case 310 may determine whether a particular boundary condition 302 is applicable to a software component 304. The relevant subset of the aspects 314 giving the boundary conditions 302 are to be selected based on the use case 310. For example, the aspects applicable to a software component 304 based on use case may include legal regulations 314a, product standards 314b, or architecture guidelines 314c. Further, each boundary condition 302 is associated with at least one check 312 to be applied to the component 304 according to the definition in the use case 310. Each check 312 may be a specific analysis or determination of whether a software component 304 meets a formalized functional requirement as defined by the boundary conditions 302.

As illustrated in FIG. 3, a boundary condition 302 may affect not only the specific checks 312 to be applied to a software component 304 but also may affect the scope 306 for determining which additional components may be identified for further assessment. In other words, the scope 306 for analyzing components may be extended depending on the boundary conditions 302 involved. Accordingly, the boundary conditions 302 may require different perspectives 308 to be considered depending on the demands of the use case 310. A perspective may consist of a view of software components, such as whether certain components are relevant from a platform perspective 308a, a design time perspective 308b, or a runtime perspective 308c. Consequently, the perspective specific view may extend the scope 306 to include new components to be analyzed as a part of the initial component assessment. A different but related component may then be identified for assessment if the related component is within the extended assessment scope 306. In other words, relevant components in addition to the original software component may need to be included in the assessment of the original software component due to dependencies and other related factors. Accordingly, an additional component is designated for assessment if it is within the relevant assessment scope 306. Additional components may be identified and included in the assessment as more components are analyzed for dependencies.

Figure 4:
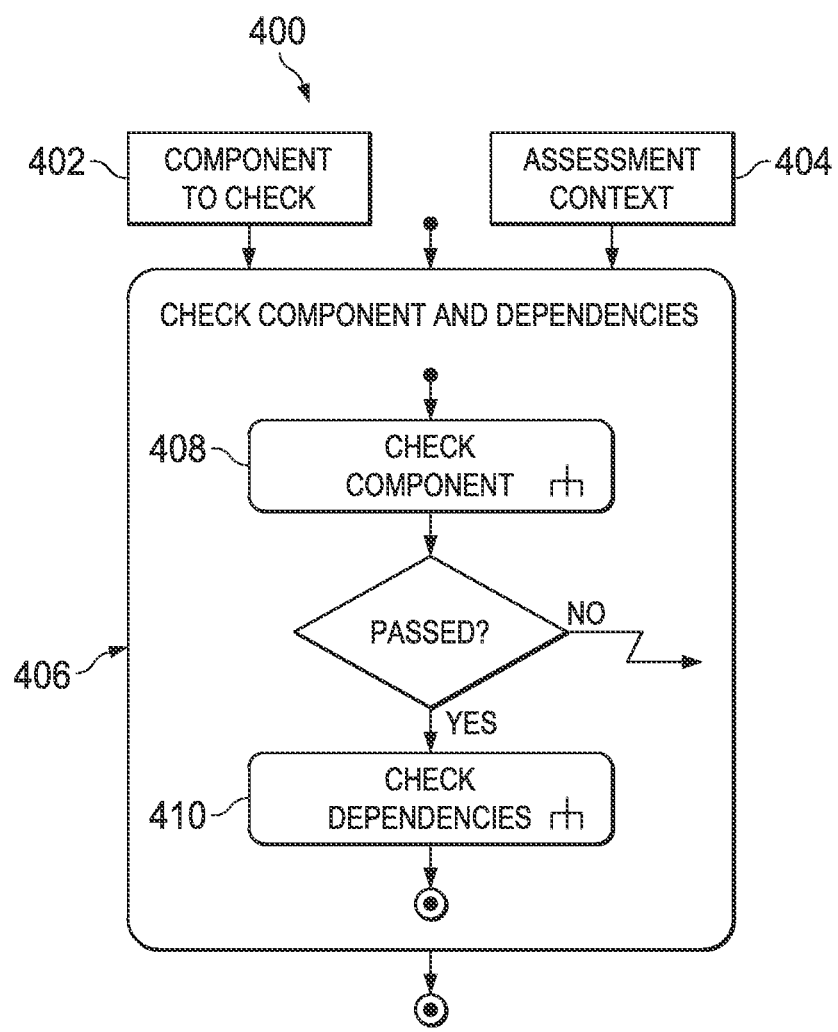
FIG. 4 is a diagram illustrating an example process for checking components and dependencies using an appropriate system, such as the system described in FIG. 2.

FIGS. 4-7 illustrate example diagrams of processes used to perform component assessment. FIG. 4 illustrates an example process 400 for assessing a component and its dependencies for meeting a set of criteria or requirements. An original software component 402 may be identified for assessment, and certain processes may be performed to comprehensively select relevant components based on, for example, the model 300 illustrated in FIG. 3 to make sure no components critical to the assessment are missed. The original software component 402 may be analyzed, or checked, by calling a Check Component and Dependencies function 406 for checking the component and dependencies of the component 402. In some instances, the Check Component and Dependencies function 406 may be performed by one or more applications, such as, for example, by the dependency check module 272 and the component check module 274 illustrated in FIG. 2. The particular software component 402 to be analyzed or checked as well as the assessment context 404 for the software component 402 may be included as inputs into the function 406 for checking the original component 402 and dependencies of the component 402. The assessment context 404 may include any information used to determine appropriate components for assessment in addition to the initial component 402. In some instances, the assessment context 404 may include one of or a combination of a particular use case 310, scope 306, aspect 314, perspective 308, or boundary condition 302.

Given the software component 402 and assessment context 404 inputs, the Check Component and Dependencies function 406 may call a Check Component function 408 to perform the appropriate checks 312 of the component 304 based on the boundary condition 302, use case 310, or other factors associated with the assessment context 404. In some implementations, the Check Component function 408 is performed by the component check module 274. Alternatively, the Check Component function 408 may be performed manually by a user. The Check Component function 408 determines whether the particular software component 402 meets the requirements defined by the assessment context 404, such as licensing, support, or architecture requirements. If the software component 402 does not pass the check 408, the process exits the Check Component and Dependencies function 406. If the software component 402 passes the check 408, the Check Dependencies function 410 may be called.

Figure 5:
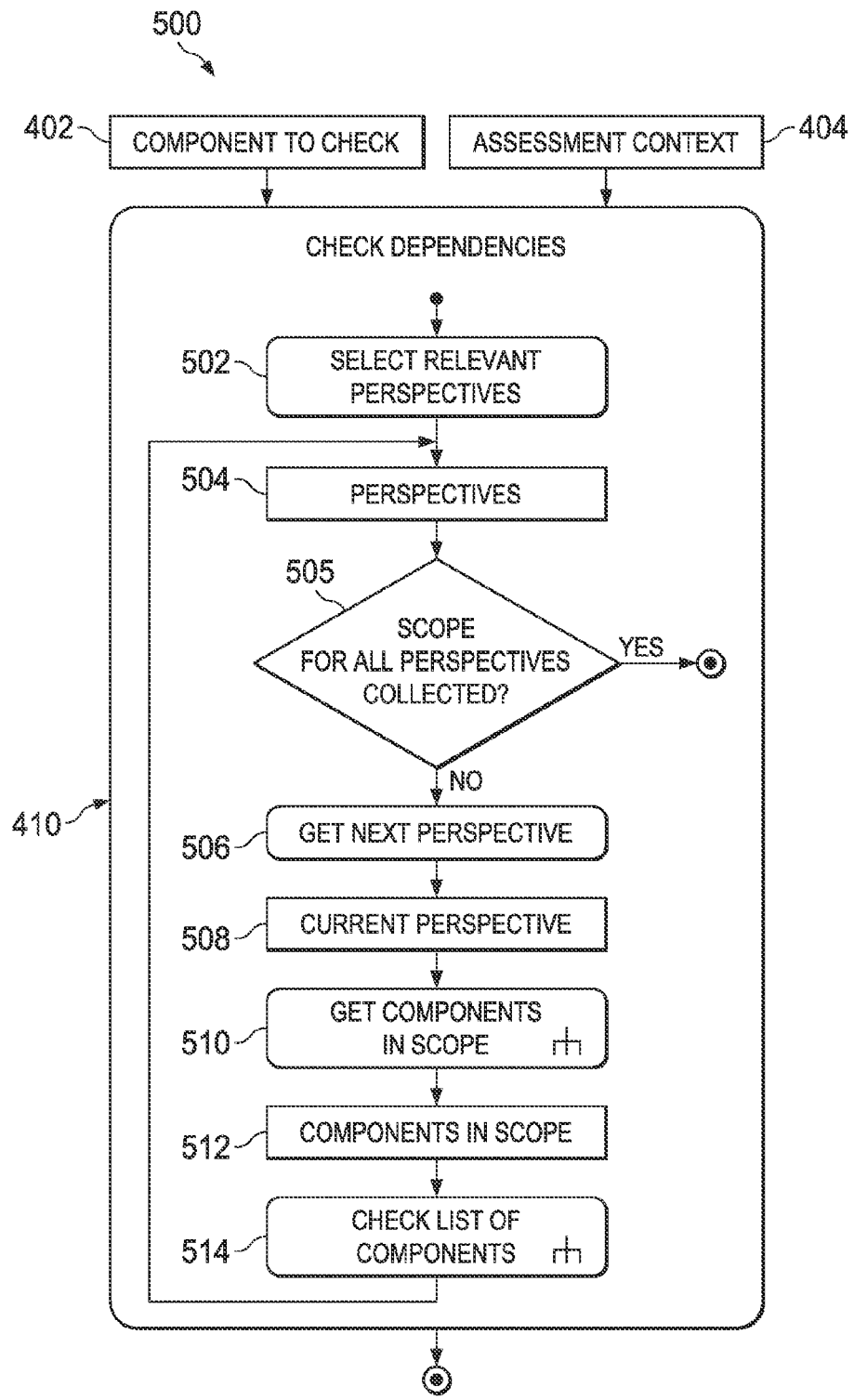
FIG. 5 is a diagram illustrating an example process for checking component dependencies using an appropriate system, such as the system described in FIG. 2.

FIG. 5 illustrates an example process 500, which may correspond to the Check Dependencies function 410 described in FIG. 4, for checking dependencies of a software component 402. As depicted in FIG. 5, the Check Dependencies function 410 may be called to determine whether there are related components to assess based on dependencies associated with the initial software component 402. In some instances, the dependency check module 272 may perform the tasks within the check dependencies function 410. First, the process enumerates potential components for assessment across relevant perspectives. Accordingly, relevant perspectives 504 are selected at 502. The relevant perspectives 504 may need to be identified from the assessment context 404 (e.g., a particular use case for using the checked component) by getting relevant aspects and deducing boundary conditions as intermediate steps (not shown on the diagram). The perspective 504 in turn determines the scope of what is relevant for assessment and what is not relevant.

For example, if a particular component is to be shipped to a customer, the component may be associated with a shipment perspective as well as a runtime perspective. The shipment perspective may include components within the entire shipment package and any delivery infrastructure dependencies, in case the dependencies contain, for example, separate artifacts specific to a particular technology. The component may also be configured for a runtime platform, and so the runtime perspective for the component may need to include the component and its runtime dependencies as well as the runtime infrastructure (e.g., a specific runtime container and the libraries used by the runtime container).

As described above, each relevant perspective may correspond to a particular scope, and if there are additional components within each scope, the additional components in each of the scopes may need to be identified. Accordingly, a determination is made at 505 as to whether the scope for all relevant perspectives associated with a particular component to check 402 has been collected. If the scopes for all perspectives, as well as any additional components that may be found within the scopes, have been collected, the process exits the Check Dependencies function 410 and proceeds to get the next component to check by calling the Check List of Components function 514, described in further detail in relation to FIG. 7. If, however, not all scopes for all relevant perspectives have been collected, the next perspective is identified at 506. For each of the identified perspectives 508, the components within the particular scope associated with the identified perspective 508 may need to be collected. Accordingly, the Get Components in scope function 510 may be called to collect any components 512 within the scope associated with the current perspective 508.

Figure 6:
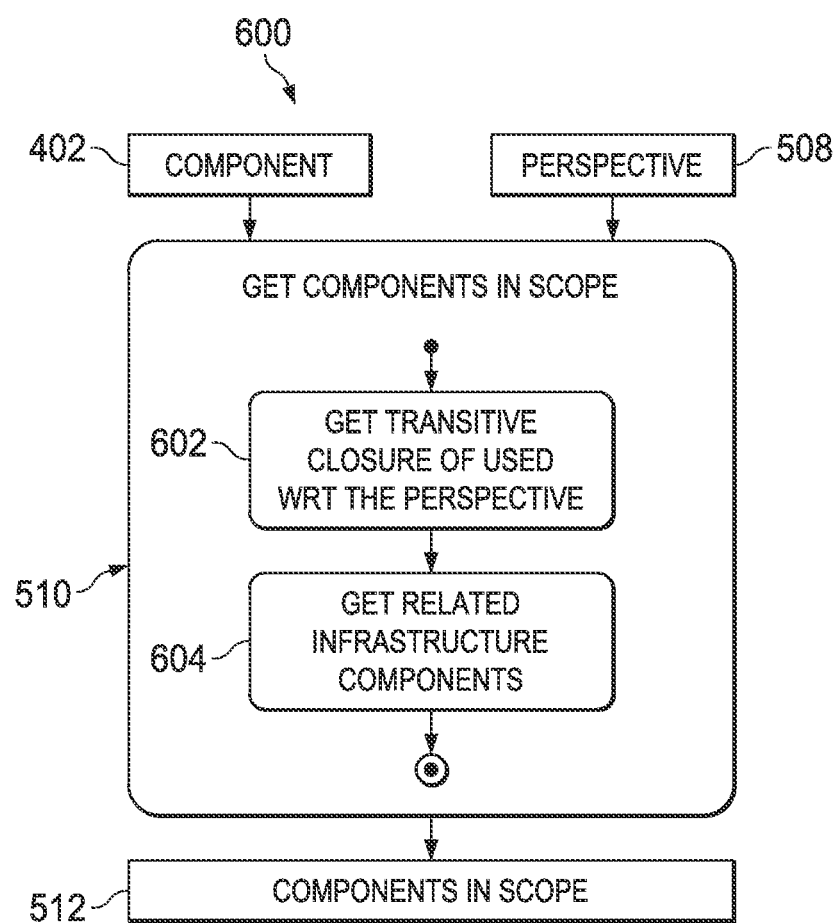
FIG. 6 is a diagram illustrating an example process for identifying the components within a particular scope using an appropriate system, such as the system described in FIG. 2.

FIG. 6 illustrates an example process 600 for identifying the components within a particular scope. The process 600 may correspond to the Get Components in Scope function 510 described in relation to FIG. 5, which returns the components that are related to the component to check 402 within a particular scope. If additional components are identified based on identified dependencies, the initial scope may be "extended" to include the additional components. In other words, the extension may include expanding the scope to include additional layers of dependencies, such as a first layer of components upon which the initial component to check 402 depends as well as additional layers of components upon which the components in the first layer depend. Accordingly, various layers of components across different perspectives may be identified for assessment that would not typically be identified.

As illustrated in FIG. 6, the inputs to the Get Components in Scope function 510 are the current component to check 402 and the current perspective 508. Each perspective may be associated with a particular scope. Accordingly, the components within the scope associated with the current perspective 508 are collected using the Get Components in Scope function 510.

First, the components that are related to the component to be checked 402, including components identified via transitive closure, are collected at 602. For example, a first component may depend on a second component because the first component calls the second component. The second component would be identified as a related component based on a dependency. The transitive closure process would then determine whether the second component depends on other components. If the second component depends on a third component (e.g., the second component calls the third component during execution of the second component), the third component is also identified at 602 as related to the first component based on transitive properties. Accordingly, both the second and third components may need to be assessed with the first component. The Get Components in Scope function 510 also identifies any related infrastructure components that may also need to be assessed at 604. Accordingly, the Get Components in Scope function 510 returns the components 512 found within the particular scope associated with the current perspective 508, which may include related software components and infrastructure components.

Using the example commercial product described above in relation to FIG. 1, for example, the relevant components within a scope associated with a design time perspective for the commercial software product may include the web toolkit design time library 124 and elements associated with the web toolkit build infrastructure. The elements associated with the web toolkit build infrastructure may include, for example, the web toolkit compiler 114, the automated software build tool 116, the automated software build tool script 115 specific to the web toolkit application 104, or libraries associated with the automated software build tool 116. Accordingly, the Get Components in Scope function 510 may return the elements described above if applied to the commercial software product described above in connection with FIG. 1.

Figure 7:
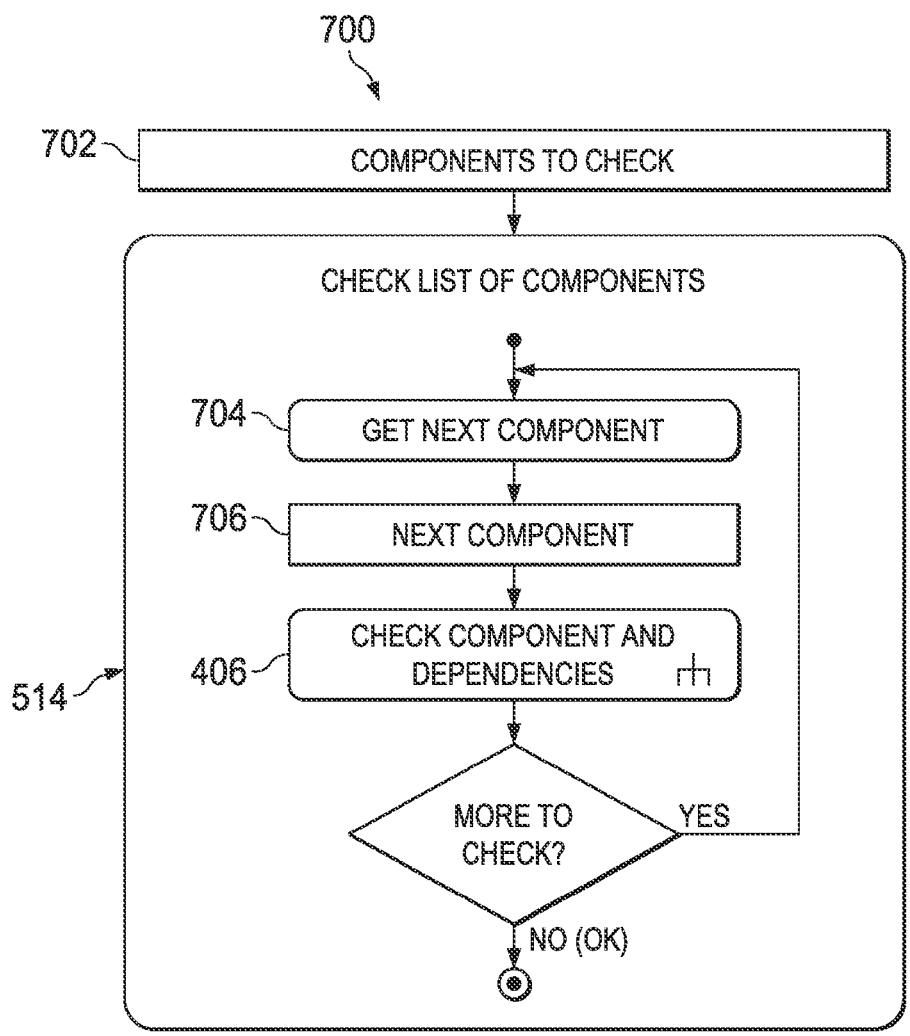
FIG. 7 is a diagram illustrating an example process for determining additional components to be checked for assessment using an appropriate system, such as the system described in FIG. 2.

Returning to FIG. 5, the components 512 in the scope associated with the current perspective 508 are returned by the Get Components in Scope function 510. The process may then call a Check List of Components function 514 to determine whether there are additional components to check. FIG. 7 illustrates an example process 700, which may correspond to the Check List of Components function 514, for determining whether there are additional components to be checked for assessment. First, a list of components to check 702 is included as an input to the Check List of Components function 514. Based on the list of components to check 702, the next component is determined at 704. Given the next component 706, a recursive call to the Check Component and Dependencies function 406 may be performed. By recursively calling the Check Component and Dependencies function 406, the same check included in the Check Component function 408 may be applied to infrastructure elements. For example, in cases where the runtime container also requires a specific build infrastructure and may need to be deployed to a runtime platform, the infrastructure components may also be checked for any relevant requirements.

Figure 8:
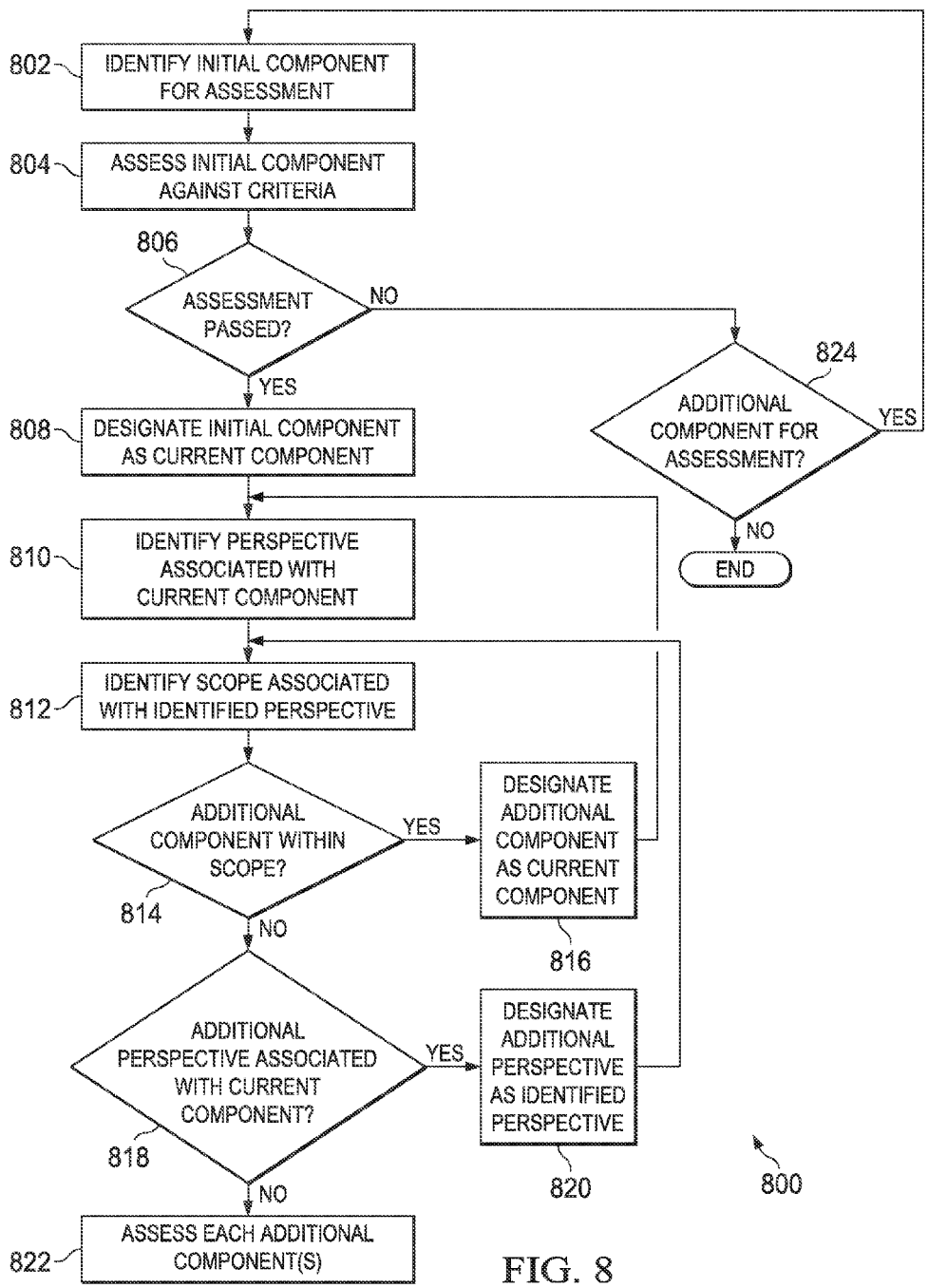
FIG. 8 is a flowchart of an example process for identifying and assessing a software component and additional components identified based on dependencies using an appropriate system, such as the system described in FIG. 2.

FIG. 8 illustrates an example process 800 for identifying and assessing a software component and additional components identified based on dependencies. First, an initial component is identified for assessment at 802. The initial component is assessed against criteria at 804. A determination is made at 806 as to whether the initial component passed the assessment. If the initial component does not pass the assessment, the process 800 may determine whether there are additional components for assessment at 824. If there are additional components for assessment, the process 800 may return to identification of other possible components at 802. If the initial component passes the assessment, the initial component may be designated as the current component at 808. A perspective associated with the current component is identified at 810. A scope associated with the identified perspective is identified at 812.

A determination is made as to whether additional components are within the scope at 814. If an additional component is found within the scope, the additional component is designated as the current component at 816. The process 800 then returns to 810 to repeat the steps for determining whether other components related to the additional component may be identified for assessment. If the determination at 814 does not identify additional components, a determination is made at 818 for whether there are additional perspectives associated with the current component at 818. If there are additional perspectives associated with the current component, the additional perspective is designated as the identified perspective at 820. The process 800 then returns to 812 to repeat the steps for determining whether additional components may be identified within the scope associated with the additional perspective. If the determination at 818 does not identify additional perspectives associated with the current component, then each of the additional components identified in the process 800, if any, are assessed at 822.

The preceding figures and accompanying description illustrate example processes and computer implementable techniques. Environment 200 (or its software or other components) also contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method performed by one or more processors for assessing software components, the method comprising the following operations:
    identifying a software component for assessment based upon an assessment context;
    analyzing dependencies associated with the software component, wherein analyzing dependencies includes:
        identifying at least one relevant perspective associated with the software component, the at least one relevant perspective representing a view of software components and the relevance of the software component based upon the assessment context, wherein the assessment context includes information used to determine appropriate other software components for assessment in addition to the software component and is a particular software component use case for the software component used for identifying the at least one relevant perspective by deducing boundary conditions from obtaining relevant boundary condition aspects, wherein the boundary conditions are software requirements imposed on the particular software component;
        identifying a scope associated with the at least one relevant perspective, wherein the scope can be expanded using the perspective view and boundary conditions to include multiple layers of dependencies associated with the software component; and
        determining, using a transitive closure process, whether the software component is associated with at least one related infrastructure component based on the scope or at least one other software component that the software component depends on based on the scope; and
    assessing the software component and each of the at least one related infrastructure component or the at least one other software component against a set of criteria.

2. The method of claim 1, wherein the set of criteria includes at least one of licensing, supportability, delivery, platform availability, or architecture assessment.

3. The method of claim 1, wherein the at least one relevant perspective includes at least one of a platform perspective, a design time perspective, or a runtime perspective.

4. The method of claim 1, wherein identifying the scope includes defining relevant criteria to include in the set of criteria for assessing the software component.

5. The method of claim 1, wherein determining whether the software component is associated with at least one other software component that the software component depends on includes identifying software components related to the software component based on transitive properties.

6. The method of claim 1, further comprising:
    iteratively analyzing dependencies for each of the at least one related infrastructure component or the at least one other software component to identify additional software components or infrastructure components for assessment; and
    assessing the additional software components or infrastructure components against the set of criteria.

7. The method of claim 1, further comprising extending the scope to include potential components upon which the at least one related infrastructure component or the at least one other software component depend.

8. A computer program product encoded on a non-transitory, tangible storage medium, the product comprising computer readable instructions for causing one or more processors to perform operations comprising:
    identifying a software component for assessment based upon an assessment context;
    analyzing dependencies associated with the software component, wherein analyzing dependencies includes:
        identifying at least one relevant perspective associated with the software component, the at least one relevant perspective representing a view of software components and the relevance of the software component based upon the assessment context, wherein the assessment context includes information used to determine appropriate other software components for assessment in addition to the software component and is a particular software component use case for the software component used for identifying the at least one relevant perspective by deducing boundary conditions from obtaining relevant boundary condition aspects, wherein the boundary conditions are software requirements imposed on the particular software component;

identifying a scope associated with the at least one relevant perspective, wherein the scope can be expanded using the perspective view and boundary conditions to include multiple layers of dependencies associated with the software component; and determining, using a transitive closure process, whether the software component is associated with at least one related infrastructure component based on the scope or at least one other software component that the software component depends on based on the scope; and assessing the software component and each of the at least one related infrastructure component or the at least one other software component against a set of criteria.

9. The computer program product of claim 8, wherein the set of criteria includes at least one of licensing, supportability, delivery, platform availability, or architecture assessment.

10. The computer program product of claim 8, wherein the at least one relevant perspective includes at least one of a platform perspective, a design time perspective, or a runtime perspective.

11. The computer program product of claim 8, wherein identifying the scope includes defining relevant criteria to include in the set of criteria for assessing the software component.

12. The computer program product of claim 8, wherein determining whether the software component is associated with at least one other software component that the software component depends on includes identifying software components related to the software component based on transitive properties.

13. The computer program product of claim 8, wherein the operations further comprise:

iteratively analyzing dependencies for each of the at least one related infrastructure component or the at least one other software component to identify additional software components or infrastructure components for assessment; and assessing the additional software components or infrastructure components against the set of criteria.

14. The computer program product of claim 9, wherein the operations further comprise extending the scope to include potential components upon which the at least one related infrastructure component or the at least one other software component depend.

15. A system, comprising:

memory operable to store at least one software component; and one or more processors operable to:

identify a software component for assessment based upon an assessment context;

analyze dependencies associated with the software component, wherein analyzing dependencies includes:

identifying at least one relevant perspective associated with the software component, the at least one relevant perspective representing a view of software components and the relevance of the software component based upon the assessment context, wherein the assessment context includes information used to determine appropriate other software components for assessment in addition to the software component and is a particular software component use case for the software component used for identifying the at least one relevant perspective by deducing boundary conditions from obtaining relevant boundary condition aspects, wherein the boundary conditions are software requirements imposed on the particular software component;

identifying a scope associated with the at least one relevant perspective, wherein the scope can be expanded using the perspective view and boundary conditions to include multiple layers of dependencies associated with the software component; and determining, using a transitive closure process, whether the software component is associated with at least one related infrastructure component based on the scope or at least one other software component that the software component depends on based on the scope; and assess the software component and each of the at least one related infrastructure component or the at least one other software component against a set of criteria.

16. The system of claim 15, wherein the at least one relevant perspective includes at least one of a platform perspective, a design time perspective, or a runtime perspective.

17. The system of claim 15, wherein identifying the scope includes defining relevant criteria to include in the set of criteria for assessing the software component.

18. The system of claim 15, wherein determining whether the software component is associated with at least one other software component that the software component depends on includes identifying software components related to the software component based on transitive properties.

19. The system of claim 15, wherein the one or more processors are further operable to:

iteratively analyze dependencies for each of the at least one related infrastructure component or the at least one other software component to identify additional software components or infrastructure components for assessment; and assess the additional software components or infrastructure components against the set of criteria.

20. The system of claim 15, wherein the one or more processors are further operable to extend the scope to include potential components upon which the at least one related infrastructure component or the at least one other software component depend.

* * * * *